United States Patent [19]
Callahan

[11] 4,276,685
[45] Jul. 7, 1981

[54] PORTABLE IN-LINE PRESS

[76] Inventor: David K. Callahan, 102 Partridge Cir., Summerville, S.C. 29483

[21] Appl. No.: 102,764

[22] Filed: Dec. 12, 1979

[51] Int. Cl.$^3$ .................. E21B 19/00; B23P 19/04
[52] U.S. Cl. .................................. 29/252; 254/29 R
[58] Field of Search ................. 29/252, 259–261, 29/266; 254/29 R, 29 A, 93 R, 106

[56] References Cited

U.S. PATENT DOCUMENTS

| 966,191 | 8/1910 | Gampwell et al. | 29/252 |
| 2,490,284 | 12/1949 | Simart | 29/252 X |
| 3,096,075 | 7/1963 | Brown | 254/29 R |
| 3,638,294 | 2/1972 | Durant | 29/252 |
| 3,726,506 | 4/1973 | Vanderwaal et al. | 254/29 R |
| 4,103,910 | 8/1978 | Silvey | 254/93 R X |

*Primary Examiner*—Robert C. Watson

*Attorney, Agent, or Firm*—Larry Harold Kline

[57] ABSTRACT

A device is provided for use in removing a first object from a second object, in which the first object is set fast, comprising a first manifold in which the first object is positioned, a second manifold in which the first object may be positioned with the second object pressed against the side of the second manifold furtherest from the first manifold, object securing apparatus secured to the first manifold on the side of the first manifold furtherest from the second manifold, first hydraulic apparatus operative to control the object securing apparatus, and second hydraulic apparatus comprising second pistons which extend through the first manifold and press against the object securing apparatus in order to vary the distance between the first manifold and the second manifold and to apply additional securing pressure on the object securing apparatus.

24 Claims, 8 Drawing Figures

PORTABLE IN-LINE PRESS

This invention relates to a device for removing a shaft which is embedded into an object and more particularly to a device which is portable and can be taken to the shaft and the object.

In working with various types of machinery, a problem which can frequently arise is the problem of a shaft frozen or pressed in an object. In many cases, various machinery has to be out of service for extended times while the machinery is dismantled to be taken to a place in order for the shaft to be removed. The present invention is a Portable In-Line Press which can be taken to the site where the problem exists.

An object of this invention is to provide a portable in-line press which can be taken to the site where the problem exists.

Another object of this invention is to provide a press which is mobile, reliable, and fairly inexpensive, and which can be utilized at the site of the problem.

Still another object of this invention is to provide a hydraulic portable in-line press which does not require an external power source.

Still another object of this invention is to provide a portable in-line press utilizing a double pump hydraulic system.

Another object of this invention is to provide a portable in-line press which can utilize various attachments to pull shafts from various spaced objects.

These and other objects and features of the invention will be apparent from the following description and appended claims.

Briefly, the invention is a device for removing a first object from a second object in which the first object is set fast. A first manifold has a first opening through which the first object may be positioned. A second manifold has a second opening through which the second object may be positioned with the second object being pressed against the side of the second manifold furtherest from the first manifold. Object securing means is rigidly secured to the first manifold on the side of the first manifold furtherest from the second manifold. First hydraulic means is connected to and within the device and is operative to control the object securing means. Second hydraulic means is connected to and within the device and is operative to vary the distance between the first manifold and the second manifold. The first object may be positioned within the first opening of the first manifold and the second opening of the second manifold with the second object pressed against the side of the second manifold furtherest from the first manifold. The first hydraulic means can be activated to secure said first object within said object securing means. The second hydraulic means can be activated to move the first manifold apart from the second manifold thereby removing the first object from the second object. The first hydraulic means comprises a first hydraulic pressure producing means, which is connected to the device and a plurality of first pistons operative responsive to the first hydraulic pressure producing means and positioned to press against the object securing means. The second hydraulic means comprises second hydraulic pressure producing means and a plurality of second pistons operative responsive to the second hydraulic pressure producing means and positioned to pass through the first manifold and pressed against the object securing means. The object securing means comprises a plurality of jaws, the movement of which is operative responsive to the first hydraulic means. A plurality of jaw supports is secured to the first manifold on the side of the first manifold furtherest from the second manifold. The object securing means has a plurality of pivot connectors, each of the plurality connectors extends through a pair of the plurality of jaw supports and through one of the plurality of jaws whereby each of the plurality of jaws pivots on one of the plurality of pivot connectors. When the first hydraulic means is activated, the first object can be secured by the pressing of the plurality of jaws against the surface of the first object. The object securing means further comprises a plurality of adjustment means. One of the plurality of adjustment means extends through each of the plurality of jaws and presses against one of the plurality of first pistons. The positioning of the contact between the plurality of the first pistons and the object securing means can be individually adjusted. One of the plurality of first pistons and one of the plurality of second pistons presses against one of the plurality of jaws. The device may comprise two jaws, two first pistons, two second pistons, and two adjustment means. The device further comprises a plurality of tension means to help secure the first manifold to the second manifold. A plurality of allignment guides is secured within the second manifold and extends through an opening in the first manifold. Each of the plurality of allignment guides has a stop secured to its outer portion. These stops define the maximum operable distance of separation between the first manifold and the second manifold. The device further comprises a plurality of anchoring positions rigidly secured to the device and operable for attachments to be secured to the device. One of the attachments which can be secured to the device is a plurality of pulling arms. Each of the plurality of pulling arms would be secured within one of the plurality of anchoring positions. Each of the plurality of pulling arms would have a securing end. The plurality of pulling arms with its securing ends are operative to hold the second object in position. A second tension means may be connected to the plurality of pulling arms and operate to secure and stabilize the second object. A pushing shaft may be utilized to be secured within the object securing means and to press against the first object. The pushing shaft may have a shoulder which will rest upon the top of the object securing means. Another attachment for the device would include a plurality of rods. The plurality of rods would be secured within the plurality of anchoring positions. A plurality of securing openings would be within each of the plurality of rods. A support is connected to each of the plurality of rods in one of the plurality of securing openings in each rod. A bushing is secured within the support. The bushing has a center opening and a flanged pressing surface bottom. The pushing shaft is pressed against the first object. The second object is an irregular-shaped object for this attachment. The opposite end of the first object from the end pressed against the pushing shaft is pushed against the center opening of the bushing with the flanged pressing surface bottom of the bushing pressing against the irregular-shaped object. The plurality of second pistons are positioned within a plurality of piston's housings. The bottom of the piston housings are secured to the side of the second manifold closest to the first manifold. The first manifold rests against the top of the plurality of piston housings when the second hydraulic means is not activated. A spacer connector may secure two of the plurality of jaw supports. The two jaw supports are each one of a pair of jaw supports for two different jaws. The spacer connector is operative to help stabilize the device and to be a stopping position for the first object should the first object slip from the position within the object securing means. The first hydraulic pressure producing means and the second hydraulic pressure producing means are located on the double pump assembly utilizing a single reservoir.

The invention will be more fully understood from the following detailed description and appended claims when taken with the drawings in which:

FIG. 1 is an isometric view of device 1 with the supply hoses 66 and 67 cut.

FIG. 2 is an isometric view of the double pump assembly 132 with the supply hoses 66 and 67.

FIG. 3 is a top view of double pump assembly 132.

FIG. 4 is an exploded rear view of the device 1 shown in FIG. 1 with bolts 16 and 17 not shown in this view.

FIG. 5 is an enlarged view of the top section of device 1 showing the movement of the jaws 4 and 5 with dashed lines showing the locked position and solid lines showing the rest position.

FIG. 6 is a rear view of the device 1 shown pulling a yoke 128 from shaft 129.

Figure 1:
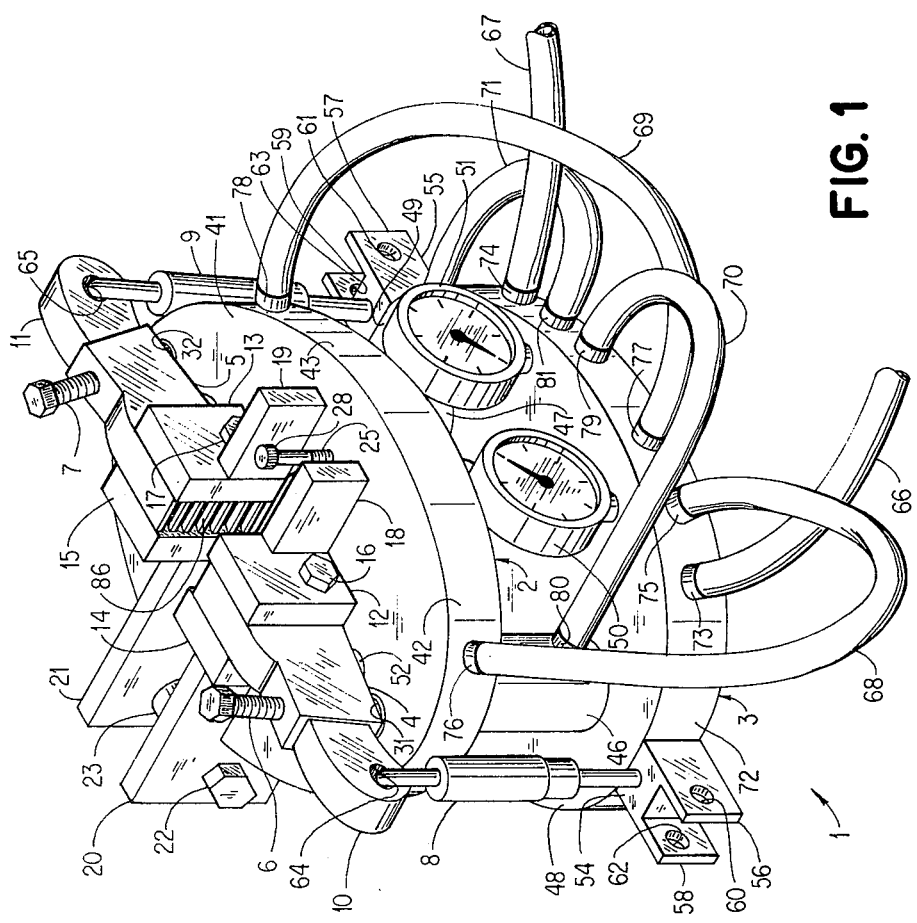

Referring now to the drawings, FIG. 1 shows a isometric view of device 1. Device 1 has an upper manifold 2 and lower manifold 3.

Device 1 has a set of jaws. Left jaw 4 and right jaw 5. Left jaw 4 has a left jaw bolt 6, which is an adjustment screw. Right jaw 5 as a right jaw bolt 7, which is an adjustment screw. The left jaw 4 is connected between front left jaw support 12 and rear left jaw support 14 and held by left pivot bolt 16. Right jaw 5 is connected between front right jaw support 13 and rear right jaw support 15 and is secured by right pivot bolt 17. Left jaw 4 is connected to left jaw extension 10. Left spring 8 is connected to left jaw extension 10 and is secured to left pivot anchor 54. Left pivot anchor 54 has a left front arm 56 and a left rear arm 58. Left front arm 56 has an opening 60. Left rear arm 58 has an opening 62.

Right jaw 5 is connected to right jaw extension 11. Right spring 9 is connected to right jaw extension 11 and to right pivot anchor 55. Right pivot anchor 55 has a right front arm 57 and a right rear arm 59. Right front arm 57 has an opening 63.

Spring 8 is secured in left jaw extension 10 in opening 64. Spring 9 is secured in right jaw extension 11 in opening 65.

The front left jaw support 12 has a left front jaw support brace 18. The rear left jaw support 14 has a left rear jaw support brace 20. The front right jaw support 13 has a right front jaw support brace 19. The right rear jaw support 15 has a right rear jaw support brace 21.

Restraining bolt 22 connects left rear jaw support brace 20 to right rear jaw support brace 21. Alligning spacer 23 is held between left rear jaw support brace 20 and right rear jaw support brace 21 by the restraining bolt 22. Restraining nut 23 secures restraining bolt 22.

Extending through upper manifold 2 are alligning guides, front alligning guide 25, left rear alligning guide 26 and right rear alligning guide 27. Stop 28 is on the top of front alligning guide 25. Stop 29 is on the top of left rear alligning guide 26. Stop 30 is on the top of right rear alligning guide 27.

Left jaw piston 31 is within and extends upward from upper manifold 2. Left jaw piston 31 presses against left jaw bolt adjustment screw 6. Right jaw piston 32 is within and extends upward from manifold 2. Right jaw piston 32 presses against right jaw bolt adjustment screw 7.

Connected to lower manifold 3 is left supply hose 66, which is connected to the front side 72 of lower manifold 3 by coupling 73. The left supply hose 66 supplies fluid to the jaw pistons 31 and 32.

Right supply hose 67 is connected to the lower manifold 3. Right support hose 67 is connected to coupling 74, which is connected to the front side 72 of lower manifold 3. Left supply hose 68 is connected to coupling 76 and to coupling 75. Coupling 75 connects the left supply hose 68 to the front side 72 of lower manifold 3. Coupling 76 connects the left supply hose 68 to the front left side 42 of upper manifold 2.

Right supply hose 69 is connected to coupling 77 and coupling 78. Coupling 77 connects the right supply hose 69 to front side 72 of lower manifold 3. Coupling 78 connects the right supply hose 69 to the front right side 43 of upper manifold 2.

Left supply hose 70 is connected to couplings 79 and 80. Coupling 79 connects the left supply hose 70 to the front side 72 of lower manifold 3. Coupling 80 connects the left supply hose 70 to the left piston housing 46. Right supply hose 71 is connected to coupling 81 and to a coupling (not shown). Coupling 81 connects to right supply hose 71 to the front side 72 of lower manifold 3. The coupling (not shown) connects right supply hose 71 to the right piston housing 47.

The left supply hose 66 is the supply hose for the jaw pistons 31 and 32. The right supply hose is the supply hose for the expansion pistons 46 and 47. The left supply hose 68 is the supply hose for the left jaw piston 31. The right supply hose 69 is the supply hose for the right jaw piston 32. The left supply hose 70 is the supply hose for the left expansion piston 46. The right supply hose 71 is the supply hose for the expansion piston 47.

Upper manifold 2 has a top 41, a front left side 42, and a front right side 43. Left gauge 50 is used to measure the hydraulic pressure on the jaw pistons 31 and 32. Right gauge 51 measures the hydraulic pressure on the expansion pistons 46 and 47.

Figure 2:
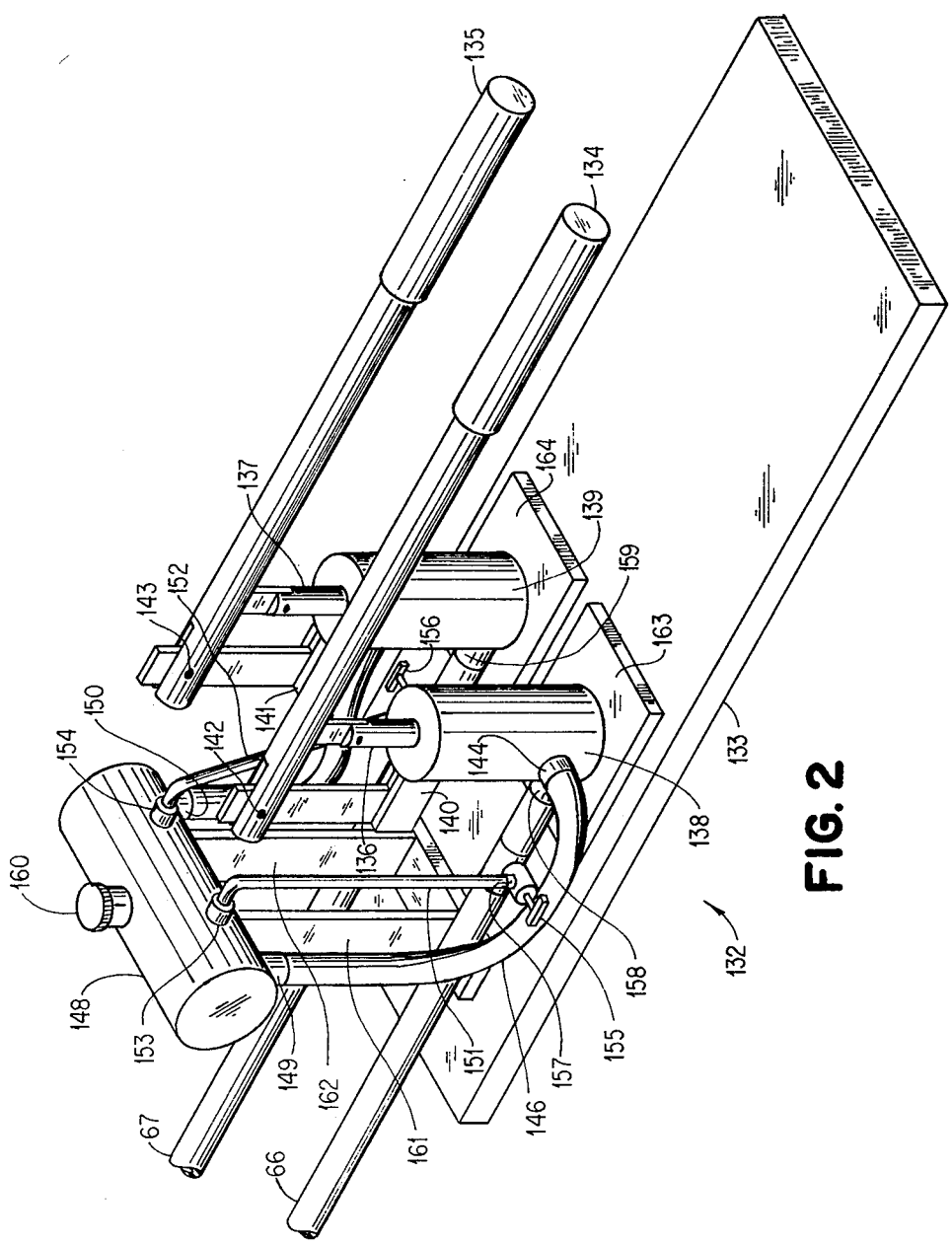

FIG. 2 is an isometric view of the double pump assembly 132. Double pump assembly 132 has a base 133 and has two basically identical hydraulic pumps. The left pump has a left pump handle 132 connected to a piston 136. The right pump has a right pump handle 135 connected to a piston 137. Piston 136 is within cylinder 138. Piston 137 is within cylinder 139. Cylinder 138 is connected to a rigid extension 140. Cylinder 139 is connected to a rigid extension 141. The rigid extension 140 extends from cylinder 138 outward and upward and is connected to left pump handle 134 by pivot connector 142. The rigid extension 141 extends from cylinder 139 outward and upward and is connected to right pump handle by pivot connector 143. Connected to cylinder 138 is left inlet connector 144 which contains a check valve. Connected to cylinder 139 is right inlet connector 145 which contains a check valve. Suction hose 146 is connected to left inlet connector 144. Suction hose 147 is connected to right inlet connector 145. Suction hoses 146 and 147 are connected to reservoir 148.

Coupling 149 connects the reservoir 148 to the suction hose 146. Coupling 150 connects the reservoir 148 to the suction hose 147. Left return line 151 is connected by coupling 153 to the reservoir 148. Right return line 152 is connected by coupling 154 to reservoir 148. Left return line 151 goes into a bleed-off valve 155. Right return line 152 connects to bleed-off valve 156. Coupling 157 connects left return line 151 to bleed-off valve 155. A coupling (not shown) connects right return line 152 to the bleed-off valve 156.

Check valve coupling 158 is connected between cylinder 138 and bleed-off valve 155. Check valve coupling 159 is connected between cylinder 139 and bleed-off valve 156.

The left supply hose 66 for jaw pistons 31 and 32 is connected to the bleed-off valve 155. Right supply hose 67 for expansion pistons 46 and 47 is connected to bleed-off valve 156. Bleed-off valves 155 and 156 are actually control valves which allows the flow of hydraulic fluid from the supply hoses 66 and 67 back into the reservoir 148. Bleed-off valve 155 allows the flow of hydraulic fluid through left supply hose 66 back into reservoir 148. Bleed-off valve 156 allows the flow of hydraulic fluid from right supply hose 67 back into the reservoir 148.

The purpose of the check valves in left inlet connector 144 is to hold the fluid within the cylider 138 when downward pressure is applied to piston 136. The purpose of the check valve in right inlet connector 145 is to hold the fluid in cylinder 139 when downward pressure is applied to piston 137. The purpose of the check valve in check valve coupling 158 is to allow hydraulic fluid to leave cylinder 138 and to fllow into left supply hose 66 when downward pressure is applied to piston 136. The purpose of the check valve in check valve coupling 159 is to allow hydraulic fluid to leave cylinder 139 and to flow into right supply hose 67 when downward pressure is applied to piston 137.

When left supply hose 66 is pressurized and it is desired to relieve the pressure, bleed-off valve 155 may be opened to allow the fluid to return to reservoir 148. When the right supply hose 67 is pressurized and it is desired to relieve the pressure, bleed-off valve 156 may be opened to allow the return of the fluid to reservoir 148. When it is desired for left supply hose 66 to be pressurized, bleed-off valve 155 is closed and the left pump handle 134 is utilized to put pressure on piston 136 forcing hydraulic fluid into the left supply hose 66 thereby pressurizing left supply hose 66. When it is desired for right supply hose 67 to be pressurized, bleed-off valve 156 is closed and the right pump handle 135 is utilized to put pressure on piston 137 forcing hydraulic fluid into the right supply hose 67 thereby pressurizing right supply hose 67.

Figure 3:
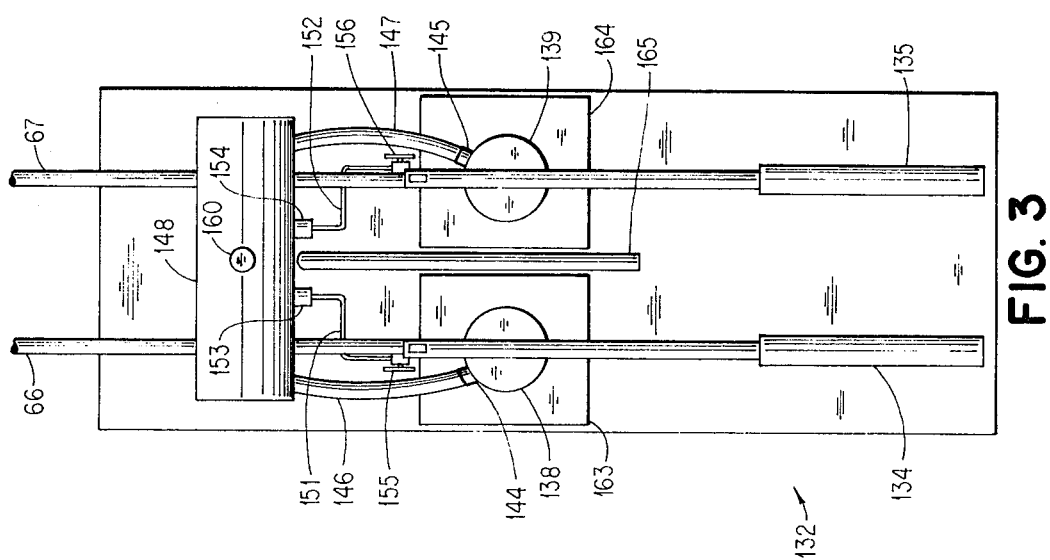

FIG. 3 is a top view of the double pump assembly 132. Reservoir input plug 160 allows for the placement of hydraulic fluid within reservoir 148. As seen in FIG. 2, reservoir 148 is supported by reservoir supports 161 and 162. The cylinder 138 is supported by a cylinder base 163, which is secured on to base 133. Cylinder 139 is secured on to cylinder base 164, which is secured on to base 133.

The double pump assembly 132 has a carry handle 165 for the convenience of the user.

Figure 4:
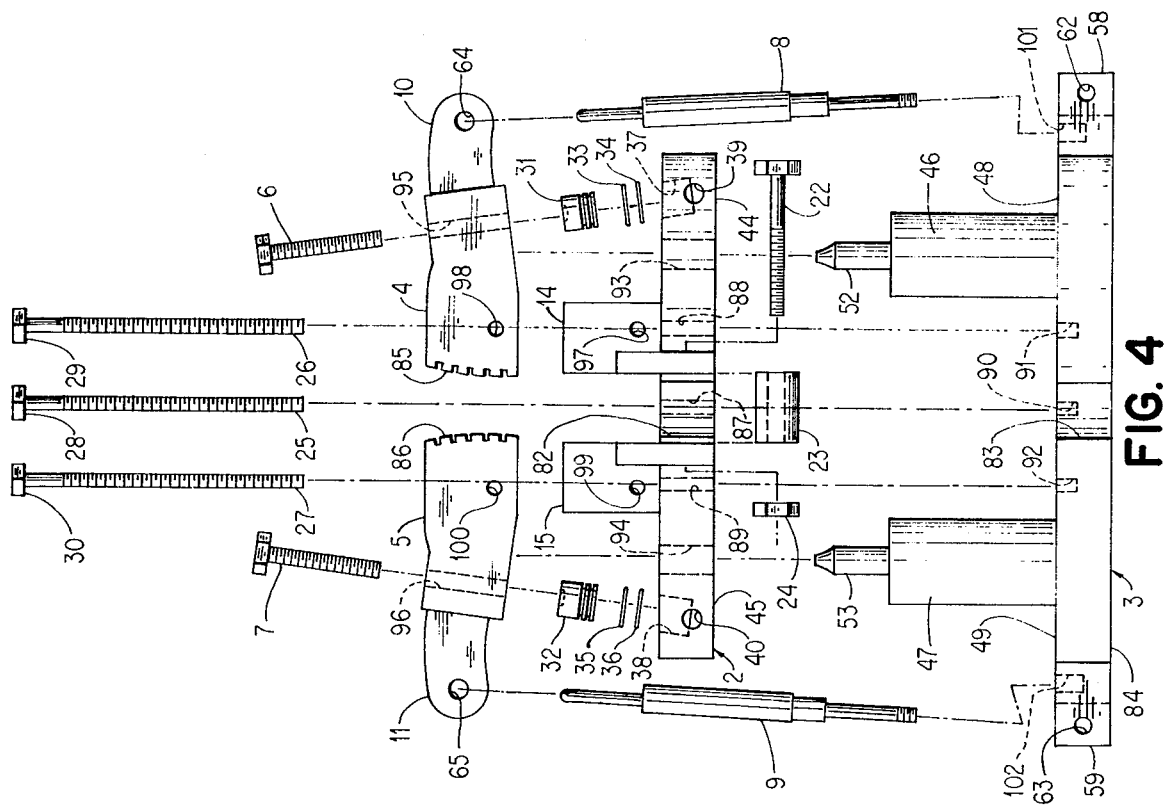

FIG. 4 is an exploded rear view of device 1. Bolts 16 and 17 are not shown in this view. The various pieces of device 1 are shown exploded so that it can be easily shown how the device is constructed. Most of the parts of device 1, which have been previously discussed herein, are shown in FIG. 4.

Figure 5:
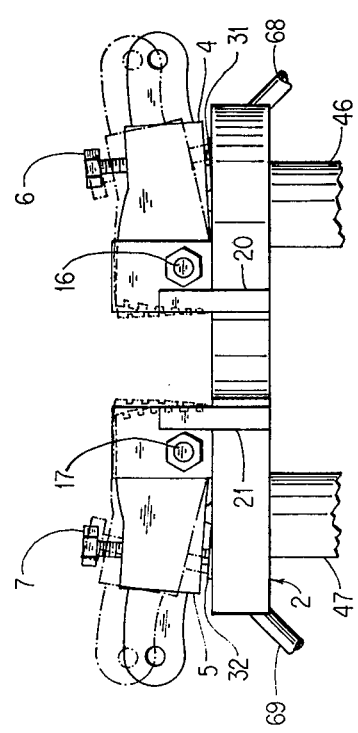

FIG. 5 is an enlarged view of the top section of device 1. Dashed lines illustrate the jaws 4 and 5 in a locked position. The solid lines show the jaws 4 and 5 at rest.

Figure 6:
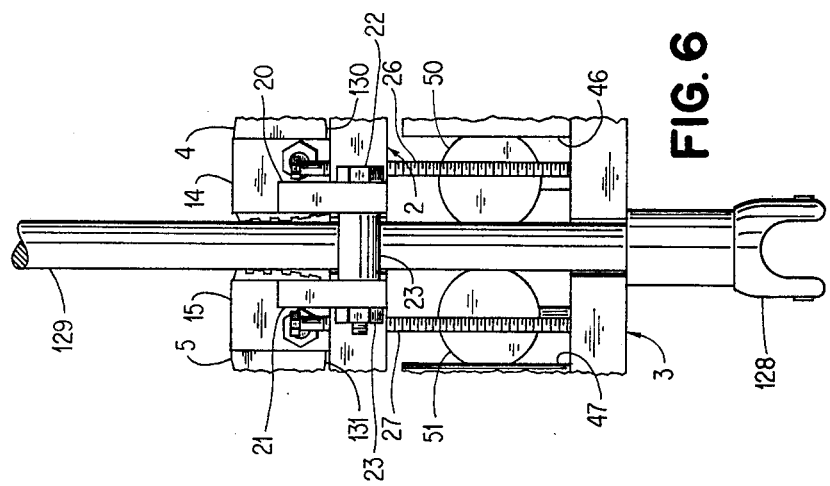

FIG. 6 is a rear view of the device 1 shown pulling a yoke 128 from a shaft 129. If the shaft 129 is rigidly connected to something, the yoke 128 will be forced from the shaft 129. If the yoke 128 is rigidly connected to something, the shaft 129 will be forced from the yoke 128. If neither the shaft 129 or the yoke 128 is rigidly secured, the device 1 will operate to simply move each away from the other.

The device 1 is utilized in any situation where any mechanical object is stuck within another mechanical object. For example, in FIG. 6 a shaft 129 is stuck within yoke 128. A primary object of the invention is to separate the two mechanical objects.

The shaft 129 extends through slot 82 in upper manifold 2 and slot 83 in lower manifoled 3. The yoke 128 presses against the bottom 84 of lower manifold 3. The shaft 129 extends between the jaws 4 and 5. Left jaw 4 has teeth 85 and right jaw 5 has teeth 86. The left pump handle 134 of double pump assembly 132 is pressed downward in order to pressurize left supply hose 66. Hydraulic fluid flows through left supply hose 66 through coupling 73 into a reservoir in lower manifold 3, out of the reservoir in lower manifold 3 and into left supply hose 68 through coupling 75 and right supply hose 69 through coupling 77. The hydraulic fluid flows through left supply hose 68 through coupling 76 directly into the piston housing for left jaw piston 31. Left jaw cylinder housing is within upper manifold 2. The fluid flowing through right supply hose 69 flows through coupling 78 into the cylinder housing for right jaw piston 32. As the fluid is pumped, the left jaw piston 31 rises and presses against left jaw bolt adjustment screw 6. This pressure causes the outer portion of the left jaw 4 where left jaw bolt adjustment screw 6 is connected to rise. The left jaw 4 is pivoted on left pivot bolt 16 and the teeth 85 are pressed into the surface of the shaft 129. As the fluid is pumped, the right jaw piston 32 rises and presses against right jaw bolt adjustment screw 7. This pressure causes the outer portion of the right jaw 5 where right jaw bolt adjustment screw 7 is adjusted to rise. The right jaw 5 is pivoted on right pivot bolt 17 and the teeth 86 are pressed into the surface of the shaft 129.

The pressure on the jaws 4 and 5 can be read on gauge 50. The outer section of the jaws 4 and 5 where the teeth 85 and 86 are located may be angled as desired in order for a proper contact with the shaft 129.

The right pump handle 135 of double pump assembly 132 is pressed downward in order to pressurize right supply hose 67. Hydraulic fluid flows through right supply hose 67 through coupling 74 into a reservoir in lower manifold 3, out of the reservoir in lower manifold 3 and into right supply hose 71 through coupling 81 and left supply hose 70 through coupling 79. The hydraulic fluid flows through right supply hose 71 through coupling (not shown) directly into the right piston housing 47. The left supply hose 70 is connected through coupling 80 into left piston housing 46.

As seen in FIG. 4, from the rear, left piston housing 46 holds piston 52. Right piston housing 47 holds piston 53. The left piston housing 46 is mounted on the top left 48 of lower manifold 3. The right piston housing 47 is mounted on the top right 49 of lower manifold 3. Pistons 52 and 53 extend through the upper manifold 2. Piston 53 extends through opening 94 in upper manifold 2. Piston 52 extends through opening 93 in upper manifold 2. Piston 53 extends through upper manifold 2 and makes contact with right jaw 5. Piston 52 extends through upper manifold 2 and makes contact with left jaw 4. As right supply hose 67 is pressurized, pistons 52 and 53 rise. Pistons 52 and 53 form a double function. The rising of pistons 52 and 53 cause the upper manifold 2 and lower manifold 3 to move apart. Since the shaft 129 is secured into jaws 4 and 5, the movement of the pistons 52 and 53 upward cause the shaft 129 and yoke 128 to be pressed apart. The second function of pistons 52 and 53 is to press against jaws 4 and 5 in order to further increase the pressure of the jaws 4 and 5 holding the shaft 129 rigidly.

As the right supply hose 67 is pressurized and the lower manifold 3 and the upper manifold 2 begin to move apart, the device 1 is held stable by the springs 8 and 9, the pistons 52 and 53 and the alligning guides 25, 26, and 27. The front alligning guide 25 is secured into the lower manifold 3 in securing opening 90. The left rear alligning guide 26 is secured in lower manifold 3 in securing opening 91. The right rear alligning guide 27 is secured in lower manifold 3 by securing opening 92. The front alligning guide 25 extends through an opening 87 in upper manifold 2. The left rear alligning guide 26 extends through opening 88 in upper manifold 2. The right rear alligning guide 27 extends through the opening 89 in upper manifold 2. Within the upper manifold 2 is a left piston housing 37 and a right piston housing 38. The hydraulic fluid enters the left piston housing 37 through left port 39. The hydraulic fluid enters the right piston housing 38 through right port 40.

The left jaw piston 31 has sealing rings 33 and 34. The right jaw piston 32 has sealing rings 35 and 36. The sealing rings seal the hydraulic fluid from flowing by the piston.

When the upper manifold 2 and the lower manifold 3 are moving apart, the yoke 128 presses against the bottom 84 of the lower manifold 3 and the shaft 129 is secured by the jaws 4 and 5 and is moving away from the yoke 128 as the upper manifold 2 is moving away from the lower manifold 3.

The shaft 129 eventually comes out of the yoke 128. If the device 1 is of such size that the moving apart of the upper manifold 2 and the lower manifold 3 is not of sufficient distance for the shaft 129 to be removed from the yoke 128, then the device 1 may be deactivated by releasing the bleed-off valves 155 and 156. The jaws 4 and 5 will be depressurized and release the shaft 129 and the entire process can be repeated for as many times as is necessary.

When the bleed-off valve 155 is opened, the jaws 4 and 5 will come apart. As the bleed-off valve 156 is opened, pistons 52 and 53 will retract into piston housings 46 and 47 and the upper manifold 2 and the lower manifold 3 will return to their original state.

Figure 7:
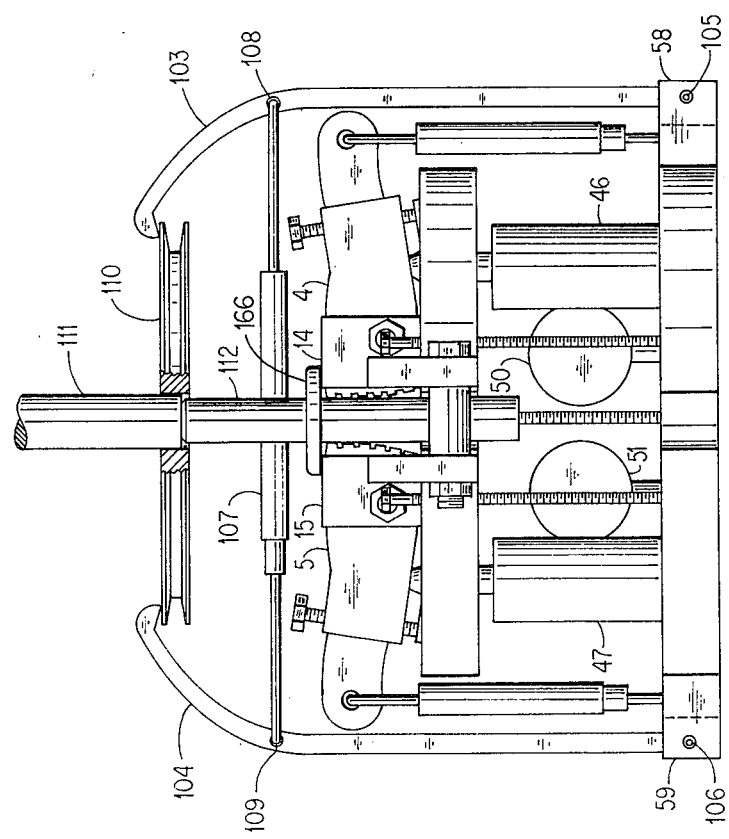
FIG. 7 is a rear view of device 1 shown utilizing a pulling attachment.

FIG. 7 is a rear view of device 1 showing a pulling attachment. Pulling arm 103 is secured between the front left arm 56 and left rear arm 58 of left pivot anchor 54. Pulling arm 104 is secured between right front arm 57 and right rear arm 59 of right pivot anchor 55. Pin 105 secured pulling arm 103 through an opening (not shown) in pulling arm 103. Pin 106 secures pulling arm 104 through an opening (not shown) in pulling arm 104.

An adjustable spring 107 is connected to pulling arm 103 at opening 108 and to pulling arm 104 at opening 109.

The purpose of the pulling attachment is to remove the gear 110 from the shaft 111. This pulling attachment may be utilized where there is not enough room to utilize the device 1 as previously described or when the shaft 111 is too large for the size of the device 1.

The device 1 may be made in any desired size; however, for any desired size device 1 made, there might always be some shaft with a larger diameter which the user might need to work with.

The device 1 may be utilized with any design of shaft. The shaft need not be round.

A pushing shaft 112 is utilized with this attachment. The pushing shaft is held between the jaws 4 and 5. The pushing shaft has a shoulder 166 completely surrounding the pushing shaft 112. The attachment is utilized with the adjustable spring 107 holding the pulling arm 103 and 104. The curved end of the pulling arms 103 and 104 hook around the upper side of the gear 110. The pushing shaft 112 is secured in place in the jaws 4 and 5. The shoulder 166 on the pushing shaft 112 rests on the top of jaw supports 12, 13, 14, and 15. As the device 1 is removed, as previously explained, the upper manifold 2 and the lower manifold 3 will move apart. Pushing shaft 112 will push against shaft 111 and will push shaft 111 out of the gear 110. The shoulder 166 on pushing shaft 112 will thereby prevent the shaft 112 from slipping back into the device 1.

The pulling attachment can also be utilized as a pushing attachment. The example as shown in FIG. 7 is used as a pushing device. If shaft 111 were defined to be rigidly secured, then the device would be a pulling device and gear 110 would be pulled from shaft 111. The pushing shaft 112 is always smaller than the shaft 111, so that the pushing shaft will not become stuck in the gear 110.

Figure 8:
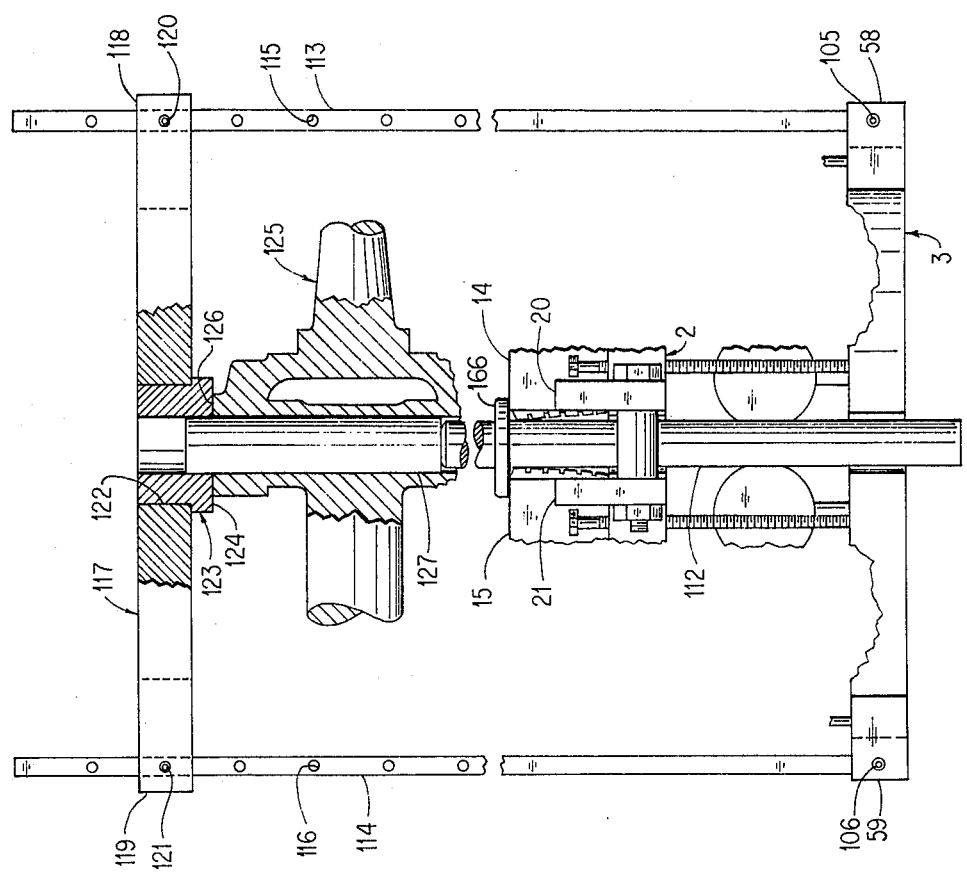
FIG. 8 is a rear view of device 1 shown utilizing a stabilizing attachment.

FIG. 8 is a rear view of the device 1 using a stabilizing attachment. Only the pertinent features of the device 1 necessary to explain the stabilizing attachment are shown in FIG. 8.

The purpose of the stabilizing attachment is to push a shaft 127 out of irregular-shaped object 125. Rod 113 is connected to device 1 in the same manner that pulling arm 103 in FIG. 7 was attached.

Rod 114 is secured to device 1 in the same manner that pulling arm 104 in FIG. 7 was attached.

Rod 113 has a plurality of holes 115. Rod 114 has a plurality of holes 116.

Support 117 is connected to rods 113 and 114. Support securing end 118 is connected by pin 120 to one of the plurality of holes 115 in rod 113.

Support securing end 119 is connected by pin 121 to one of the plurality of holes 116 in rod 114.

The support 117 may be secured at various heights as desired in the various holes in rods 113 and 114. Support 117 has an opening 122 in approximately equidistant to rods 113 and 114. A bushing 123 is secured within the opening 122 in support 117. The bushing 123 acts as a spacer and as a pressing surface. Bushing 123 has a pressing surface 124.

In operation, when the device 1 is pressurized and the upper manifold 2 and lower manifold 3 are moving apart, pushing shaft 112 is secured in the jaws 4 and 5. Pushing shaft 112 pushes against shaft 127. Shaft 127 is stuck within irregular-shaped object 125. Shoulder 166 around pushing shaft 112 keeps the pushing shaft 112 from being pushed back into device 1. As the pushing shaft 112 moves upward secured in the jaws 4 and 5, the shaft 127 is pushed upward through the bushing 123 and out of the irregular-shaped object 125.

Pressing surface 124 of bushing 123 presses against the irregular-shaped object 125 allowing the shaft 127 to be pushed through the bushing 123. Pressing surface 124 presses against the top 126 of the irregular-shaped object 125. Different bushings 123 with different openings may be utilized as desired for different diameter shafts.

This attachment can be utilized for any shaped object with any type of shafts or bushings.

The left piston housing 46, when the piston is not extended, helps support the bottom left side 44 of upper manifold 2. The bottom right side 45 of upper manifold 2, at that time, would rest on the right piston housing 47.

There are various openings in the device 1. Opening 95 in left jaw 4 allows left jaw bolt 6 to pass through. Opening 96 in right jaw 5 allows right jaw bolt 7 to pass through. Opening 97 in rear left jaw support 14 allows left pivot bolt 16 to pass through. Opening 98 in left jaw 4 allows pivot bolt 16 to pass through. Opening 99 in rear right jaw support 15 allows right pivot bolt 17 to pass through. Opening 100 in right jaw 5 allows right pivot bolt 16 to pass through. Opening 101 is a securing opening for spring 8. Opening 102 is a securing opening for spring 9.

When jaw 4 is moved, pistons 31 and 52 are pressed against bottom 130. When jaw 5 is moved, pistons 32 and 53 press against bottom 131.

The present invention can push or pull shafts out of couplings. It can push or pull bearings off of shafts. It can push or pull shafts from power take-off couplings. It can push or pull propellars from boat shafts. It can push bearings off or pull shafts out of bearings or retainers on conveyor belts or other machinery. It can pull or push shafts out of pulleys or gears. It can pull or push shafts out of pumps. It can be used for shafts of any size, simply depending on the size of the device built.

The device can be utilized on round, square or irregular-shaped shafts. The device with the pulling attachment of FIG. 7 connected, can be utilized to push pins out of bulldozier tracks. It can be utilized on any heavy equipment that uses bushings or pins.

It can be used to pull gears or pulleys off of shafts in tight areas where the device 1 would not normally fit without the attachment.

The device 1 with the attachment in FIG. 8 can be utilized to push pins or "king pins" out of spindles on trucks.

It can also be utilized for bushings or pin work. It can also be utilized for any type of irregular-shaped objects in which a shaft or some type is wedged within.

Device 1 can be utilized for industrial conveyors and conveyor belts. It can be utilized for purposes of railroad maintenance. It can be utilized in situations of accidents or emergency because the invention is portable and is easily carried to the site.

The device can be constructed with a plurality of jaws emanating from different directions to hold a desired shaft or object.

The device can be constructed in various sizes utilizing the basic principals herein. For example, the supply hoses 70 and 71 to pistons 52 and 53 may be secured on the piston housings 46 and 47 as in the drawings or could be secured to the outside of the lower manifold 3.

Different devices could replace the springs 8 and 9. Different guides, different methods of securing throughout the device. Different gauge, no gauges at all, different adjusting methods, different proportioned openings, and different means for many facets of this invention could be utilized.

The guides 25, 26, and 27 have stops 28, 29, and 30 which prevent the separation of the upper manifold 2 and the lower manifold 3 from beyond a predetermind distance. This distance is variable and different types of stop methods may be utilized.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

I claim:

1. A device for removing a first object from a second object, in which said first object is set fast, comprising:
    (a) a first manifold with a first opening through which said first object may be positioned;
    (b) a second manifold with a second opening through which said first object may be positioned with said second object pressed against the side of said second manifold furtherest from said first manifold;
    (c) object securing means rigidly secured to said first manifold on the side of said first manifold furtherest from said second manifold;
    (d) first hydraulic means connected to and within said device, operative to control said object securing means, said first hydraulic means comprising:
        (1) first hydraulic pressure producing means connected to said device; and
        (2) a plurality of first pistons operative responsive to said first hydraulic pressure producing means and positioned to press against said object securing means; and
    e. second hydraulic means connected to and within said device operative to vary the distance between said first manifold and said second manifold, said second hydraulic means comprising:
        (1) second hydraulic pressure producing means; and
        (2) a plurality of second pistons operative responsive to said second hydraulic pressure producing means and positioned to pass through said first manifold and press against said object securing means;
    whereby said first object may be positioned within said first opening of said first manifold and said second opening of said second manifold with said second object pressed against said side of said second manifold furtherest from said first manifold, said first hydraulic means can be activated to secure said first object within said object securing means, and said second hydraulic means can be activated to move said first manifold apart from said second manifold thereby removing said first object from said second object.

2. A device according to claim 1 wherein said object securing means comprises:
    (a) a plurality of jaws, the movement of which is operative responsive to said first hydraulic means;
    (b) a plurality of jaw supports secured to said first manifold on the side of said first manifold furtherest from said second manifold; and (c) a plurality of pivot connectors each of said plurality of pivot connectors extending through a pair of said plurality of jaw supports and through one of said plurality of jaws whereby said each of said plurality of jaws pivots on one of said plurality of pivot connectors;

whereby when said first hydraulic means is activated, said first object can be secured by the pressing of said plurality of jaws against the surface of said first object.

3. A device for removing a first object from a second object, in which said first object is set fast, comprising:
(a) a first manifold with a first opening through which said first object may be positioned;
(b) a second manifold with a second opening through which said first object may be positioned with said second object pressed against the side of said second manifold furtherest from said first manifold;
(c) object securing means rigidly secured to said first manifold on the side of said first manifold furtherest from said second manifold;
(d) first hydraulic means connected to and within said device, operative to control said object securing means, said first hydraulic means comprising:
 (1) first hydraulic pressure producing means connected to said device; and
 (2) a plurality of first pistons operative responsive to said first hydraulic pressure producing means and positioned to press against said object securing means; and
(e) second hydraulic means connected to and within said device operative to vary the distance between said first manifold and said second manifold, said second hydraulic means comprising:
 (1) second hydraulic pressure producing means; and
 (2) a plurality of second pistons operative responsive to said second hydraulic pressure producing means and positioned to pass through said first manifold and press against said object securing means;

wherein said object securing means comprising:
 (1) a plurality of jaws, the movement of which is operative responsive to said first hydraulic means;
 (2) a plurality of jaw supports secured to said first manifold on the side of said first manifold furtherest from said second manifold;
 (3) a plurality of pivot connectors each of said plurality of pivot connectors extending through a pair of said plurality of jaw supports and through one of said plurality of jaws whereby said each of said plurality of jaws pivots on one of said plurality of pivot connectors; and
 (4) a plurality of adjustment means, one of said plurality of adjustment means extending through each of said plurality of jaws and pressing against one of said plurality of first pistons wherein the positioning of the contact between said plurality of said first pistons and said object securing means can be individually adjusted;

whereby when said first hydraulic means is activated, said first object can be secured by the pressing of said plurality of jaws against the surface of said first object, whereby said first object may be positioned within said first opening of said first manifold and said second opening of said second manifold with said second object pressed against said side of said second manifold furtherest from said first manifold, said first hydraulic means can be activated to secure said first object within said object securing means, and said second hydraulic means can be activated to move said first manifold apart from said second manifold thereby removing said first object from said second object.

4. A device according to claim 3 wherein one of said plurality of first pistons and one of said plurality of second pistons presses against one of said plurality of jaws.

5. A device according to claim 4 wherein said device comprises two jaws, two first pistons, two second pistons, and two adjustment means.

6. A device according to claim 1 wherein said device further comprises a plurality of tension means to help secure said first manifold to said second manifold.

7. A device according to claim 6 wherein said device further comprises a plurality of alignment guides, each secured within said second manifold and extending through an opening in said first manifold.

8. A device according to claim 7 further comprising a plurality of stops, one of said plurality of stops being secured to the outer portion of said each of said plurality of allignment guides and thereby defining the maximum operable distance of separation between said first manifold and said second manifold.

9. A device for removing a first object from a second object, in which said first object is set fast, comprising:
(a) a first manifold with a first opening through which said first object may be positioned;
(b) a second manifold with a second opening through which said first object may be positioned with said second object pressed against the side of said second manifold furtherest from said first manifold;
(c) object securing means rigidly secured to said first manifold on the side of said first manifold furtherest from said second manifold;
(d) first hydraulic means connected to and within said device, operative to control said object securing means;
(e) second hydraulic means connected to and within said device operative to vary the distance between said first manifold and said second manifold; and
(f) a plurality of anchoring positions rigidly secured to said device and operable for attachments to be secured to said device, whereby said first object may be positioned within said first opening of said first manifold and said second opening of said second manifold with said second object pressed against said side of said second manifold furtherest from said first manifold, said first hydraulic means can be activated to secure said first object within said object securing means, and said second hydraulic means can be activated to move said first manifold apart from said second manifold thereby removing said first object from said second object.

10. A device according to claim 9 further comprising a plurality of pulling arms each of said plurality of pulling arms being secured within one of said plurality of anchoring positions.

11. A device according to claim 10 wherein further comprising a plurality of securing ends one on the end of each of said plurality of pulling arms and operative to hold said second object in position when said plurality of pulling arms is secured to said device.

12. A device according to claim 11 further comprising a second tension means connected to said plurality of said pulling arms and operative to secure and stabilize said second object.

13. A device according to claim 12 further comprising a pushing shaft operative to be secured within said object securing means and to press against said first object.

14. A device according to claim 13 further comprising a shoulder on said pushing shaft, said pushing shaft positioned so that said shoulder will rest upon the top of said object securing means.

15. A device according to claim 9 further comprising a plurality of rods, each of said plurality of rods being secured within one of said plurality of anchoring positions.

16. A device according to claim 15 further comprising a plurality of securing openings within each of said plurality of rods.

17. A device according to claim 16 further comprising a support connected to each of said plurality of rods in one of said plurality of securing openings in each rod.

18. A device according to claim 17 further comprising a bushing secured within said support, said bushing having a center opening and a flanged pressing surface bottom.

19. A device according to claim 18 further comprising a pushing shaft operative to be secured within said object securing means and to press against said first object.

20. A device according to claim 19 further comprising a shoulder on said pushing shaft, said pushing shaft positioned so that said shoulder will rest upon the top of said object securing means.

21. A device according to claim 20 wherein said pushing shaft is pressed against said first object and said second object is an irregular-shaped object, the opposite end of said first object from the end pressed against said pushing shaft being pushed through said center opening of said bushing with said flanged pressing surface bottom of said bushing pressing against said irregular-shaped object.

22. A device according to claim 1 wherein said plurality of second pistons are positioned within a plurality of piston housings, the bottom of which are secured to the side of said second manifold closest to said first manifold and said first manifold rests against the top of said plurality of piston housings when said second hydraulic means is not activated.

23. A device according to claim 2 further comprising a spacer connector securing two of said plurality of jaw supports operative to help stabilize said device and to be a stopping position for said first object should said first object slip from the position within said object securing means.

24. A device according to claim 1 wherein said first hydraulic pressure producing means and said second hydraulic pressure producing means are located on a double pump assembly utilizing a single reservoir.

* * * * *